(12) United States Patent
Bolton

(10) Patent No.: US 10,973,205 B2
(45) Date of Patent: Apr. 13, 2021

(54) RETAINER APPARATUS

(71) Applicant: Jamie Bennett Bolton, Mooresville, NC (US)

(72) Inventor: Jamie Bennett Bolton, Mooresville, NC (US)

(73) Assignee: Bolt-On QLK, Inc., Mooresville, NC (US)

(*) Notice: Subject to any disclaimer, the term of this patent is extended or adjusted under 35 U.S.C. 154(b) by 200 days.

(21) Appl. No.: 15/936,729

(22) Filed: Mar. 27, 2018

(65) Prior Publication Data

US 2019/0098862 A1 Apr. 4, 2019

Related U.S. Application Data

(60) Provisional application No. 62/483,581, filed on Apr. 10, 2017.

(51) Int. Cl.
| | |
|---|---|
| *A01K 1/04* | (2006.01) |
| *E04H 12/22* | (2006.01) |
| *E04H 15/62* | (2006.01) |
| *E02F 9/28* | (2006.01) |

(52) U.S. Cl.
CPC ........... *A01K 1/04* (2013.01); *E04H 12/2215* (2013.01); *E04H 12/2246* (2013.01); *E04H 15/62* (2013.01); *E02F 9/28* (2013.01)

(58) Field of Classification Search
CPC .. A01K 1/04; E04H 12/2215; E04H 12/2246; E04H 15/62; E02F 9/28; B05B 15/60; B05B 15/622; A45F 3/44
USPC .................................. 248/87, 156, 530, 545
See application file for complete search history.

(56) References Cited

U.S. PATENT DOCUMENTS

| | | | | |
|---|---|---|---|---|
| 206,531 | A * | 7/1878 | Britt | E04H 12/2215 |
| | | | | 52/154 |
| 219,203 | A * | 9/1879 | Blewett | A01K 1/04 |
| | | | | 119/786 |
| 753,835 | A * | 3/1904 | Albee | A01K 1/04 |
| | | | | 119/769 |
| 809,374 | A | 1/1906 | Holden et al. | |
| 824,182 | A * | 6/1906 | Knoff | A01K 1/04 |
| | | | | 119/786 |
| 871,564 | A * | 11/1907 | Brown | A01K 1/04 |
| | | | | 119/786 |
| 1,155,421 | A * | 10/1915 | Jones | A01K 1/04 |
| | | | | 119/780 |
| 1,385,859 | A * | 7/1921 | Bradford | A01K 1/04 |
| | | | | 119/786 |
| 2,087,176 | A * | 7/1937 | Webb | A01K 1/04 |
| | | | | 119/787 |

(Continued)

FOREIGN PATENT DOCUMENTS

GB 2 360 451 A 9/2001

*Primary Examiner* — Magdalena Topolski
*Assistant Examiner* — William L Gmoser
(74) *Attorney, Agent, or Firm* — Brian S. Steinberger; Hilary F. Steinberger; Law Offices of Brian S. Steinberger, P.A.

(57) ABSTRACT

The present invention provides methods and systems for a retainer apparatus that includes a scoop having an exterior surface and an interior surface with a central opening and a predetermined length. A retention device has a base with a length greater than the length of the central opening of the scoop and a flange portion extends upwardly from the base portion and contains at least one opening.

20 Claims, 16 Drawing Sheets

(56) References Cited

U.S. PATENT DOCUMENTS

| | | | |
|---|---|---|---|
| 2,484,263 A * | 10/1949 | Atkinson | A01K 1/04 |
| | | | 119/61.57 |
| 3,241,202 A * | 3/1966 | Knauft | E04H 15/62 |
| | | | 24/327 |
| 5,069,166 A | 12/1991 | Ahuna | |
| 5,271,196 A | 12/1993 | Fanti | |
| 5,342,229 A | 8/1994 | Whitt | |
| 5,461,833 A | 10/1995 | Murray et al. | |
| 5,884,874 A * | 3/1999 | Speece | E04H 12/2215 |
| | | | 248/156 |
| 7,353,833 B1 | 4/2008 | Palmer | |
| 7,984,698 B1 * | 7/2011 | Collins | A01K 1/04 |
| | | | 119/780 |
| 9,004,015 B2 * | 4/2015 | Krieger | A01K 29/00 |
| | | | 119/786 |
| 9,303,429 B2 | 4/2016 | Abraham | |
| 9,428,933 B2 | 8/2016 | Simonson et al. | |
| 9,453,320 B1 | 9/2016 | Peraza | |
| 10,352,014 B1 * | 7/2019 | Baptiste | A01K 1/04 |
| 2002/0112675 A1 * | 8/2002 | Lesko | A01K 1/04 |
| | | | 119/786 |
| 2005/0011471 A1 | 1/2005 | Laird | |
| 2006/0016950 A1 | 1/2006 | Bright et al. | |
| 2010/0224139 A1 * | 9/2010 | Krieger | A01K 1/04 |
| | | | 119/780 |
| 2014/0190419 A1 | 7/2014 | Harding | |
| 2015/0013734 A1 | 1/2015 | Krystopher et al. | |
| 2015/0164042 A1 * | 6/2015 | Moore | A01K 1/04 |
| | | | 119/796 |
| 2016/0221169 A1 * | 8/2016 | LeBaron | B25D 1/16 |
| 2017/0079239 A1 * | 3/2017 | Groff | A01K 1/04 |
| 2018/0195304 A1 * | 7/2018 | Hunt | G09F 17/00 |
| 2018/0195311 A1 * | 7/2018 | Prunotto | A45F 3/44 |
| 2019/0254254 A1 * | 8/2019 | Sharp | A01K 3/00 |

* cited by examiner

RETAINER APPARATUS

CROSS REFERENCE TO RELATED PATENT APPLICATION

The present patent application/patent claims the benefit of the earlier priority filing of provisional application Ser. No. 62/483,581 filed on Apr. 10, 2017 titled "DOG LEASH RETAINER APPARATUS", the contents of which are incorporate in full by reference herein.

FIELD OF THE INVENTION

The present invention relates generally to a retainer apparatus, and more generally relates to a retainer apparatus having a scoop and a retention device for retaining an object.

BACKGROUND OF THE INVENTION

Many people desire to take their dogs to the beach, and most beaches have leash laws requiring dogs to always be leashed. When the individual desires to relax in their chair or lay on a towel, it is not convenient to always retain an end of the leash in the hand. Therefore, the individual will engage the leash to a chair, an umbrella, or a spike with a swivel hook on the end. Unfortunately, a chair, umbrella, or spike are not suitable for securely retaining the dog at the desired location. It is very easy for the dog to create tension in the leash, thus moving the chair or pulling the umbrella or spike out of the ground.

When the dog is not retained on the leash, the dog is likely to chase other dogs, birds, or people on the beach. This is unlawful and not safe for the dog. It is an object of the present invention to provide a dog leash that is retained within the sand on a beach, even if the dog pulls tightly on its leash, and is easy and convenient to install.

Additionally, the user may wish to efficiently and effectively hold an item, such as an umbrella, canopy, cooler, and the like in the sand, dirt, rock, ice or other substance. It is an object of the present invention to allow a user to efficiently and effective retain these items with the use of the retainer apparatus as fully described herein.

BRIEF SUMMARY OF THE INVENTION

According to an embodiment of the present invention, a retainer apparatus includes a scoop and a retention device with the scoop having an exterior surface and an interior surface with a central opening having a predetermined length. A retention device has a base with a length greater than the length of the central opening of the scoop and a flange portion extends upwardly from the base portion and contains at least one opening.

According to another embodiment of the present invention, the retainer apparatus contains a scoop that is generally circularly shaped.

According to yet another embodiment of the present invention, the retainer apparatus has a scoop that is concave.

According to yet another embodiment of the present invention, the retainer apparatus includes a retention device with a base and a flange.

According to yet another embodiment of the present invention, the retainer apparatus includes a flange with two openings.

According to yet another embodiment of the present invention, the retainer apparatus includes a scoop and retention device composed of metal, plastic and/or wood.

According to yet another embodiment of the present invention, the retainer apparatus includes a scoop that is generally oval shaped.

According to yet another embodiment of the present invention, the retainer apparatus includes a flange that has a first end and a second end, the first end of the flange is engaged to the base and the width of the flange gradually decreases from the first end to the second end.

According to yet another embodiment of the present invention, the retainer apparatus includes a scoop composed of a different material than the retention device.

According to yet another embodiment of the present invention, the retainer apparatus includes a generally concave scoop having an exterior surface and an interior surface with a central opening and a predetermined length. The apparatus has a retention device having a base with a length greater than the length of the central opening of the scoop and a flange portion that extends upwardly from the base portion and contains at least one opening.

According to yet another embodiment of the present invention, the retainer apparatus includes a generally concave scoop having an exterior surface and an interior surface with a central opening and a predetermined length. The retention device has a base with a length greater than the length of the central opening of the scoop and a flange portion that extends upwardly from the base portion and contains two openings.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
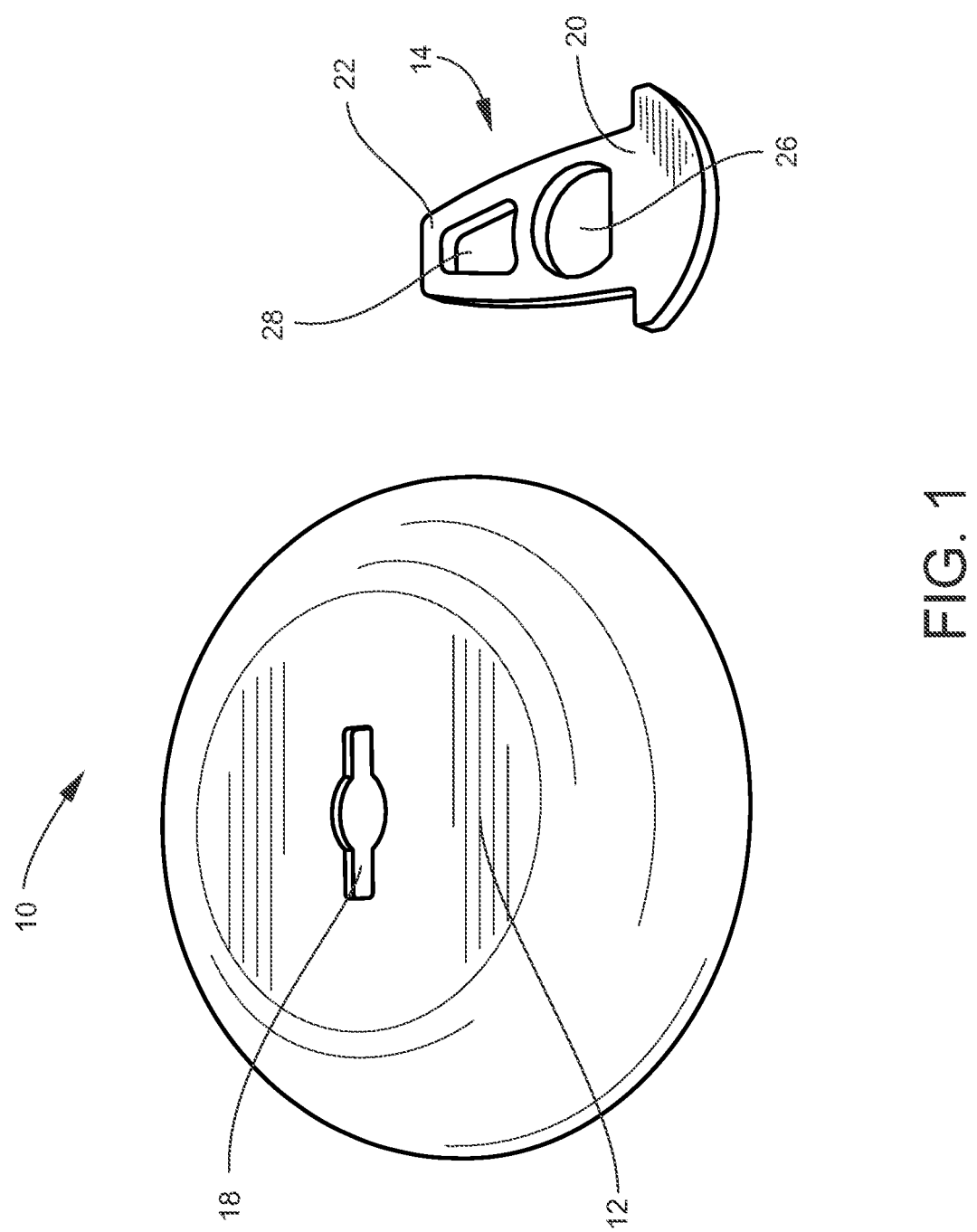
FIG. 1 is a top perspective view of the retainer apparatus.
Figure 2:
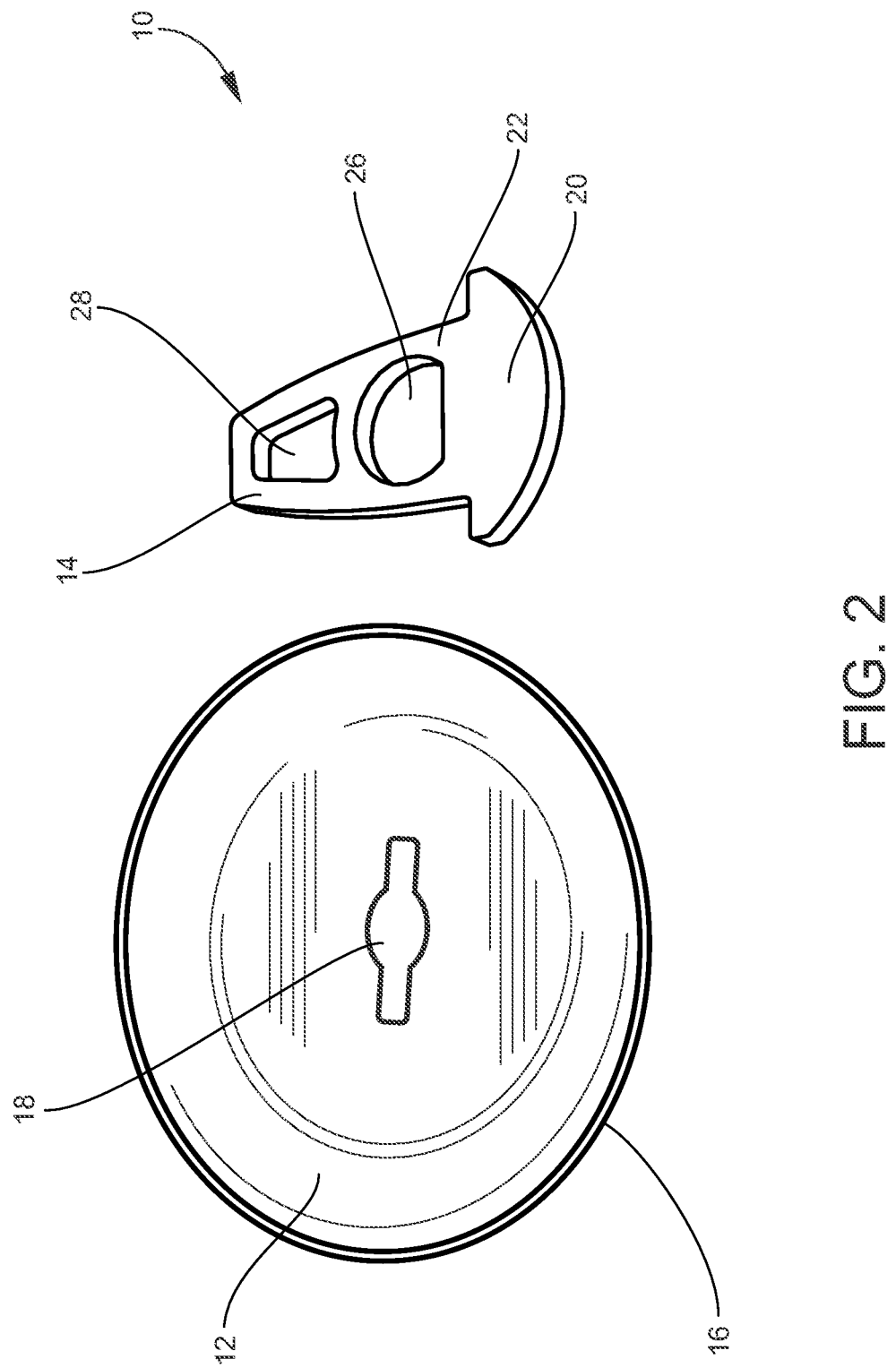
FIG. 2 to top perspective view of the retainer apparatus.
Figure 3:
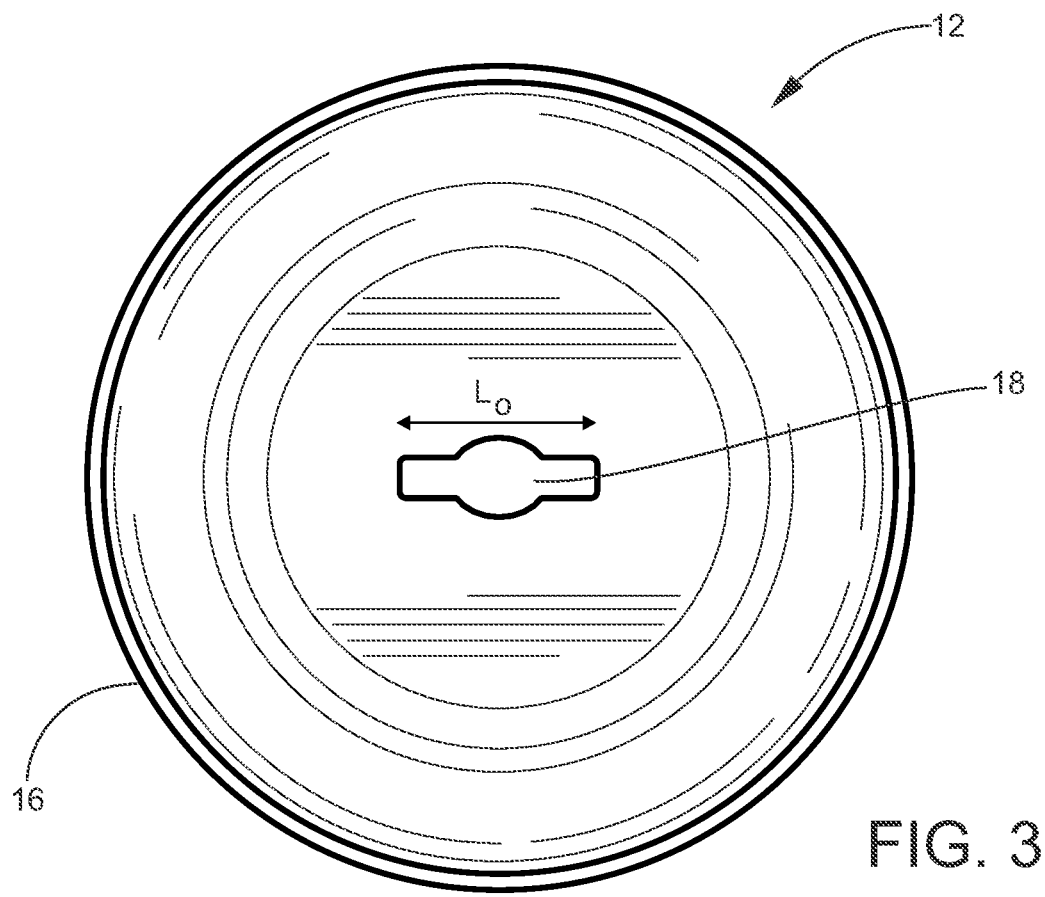
FIG. 3 is a top view of the scoop of the retainer apparatus.
Figure 4:
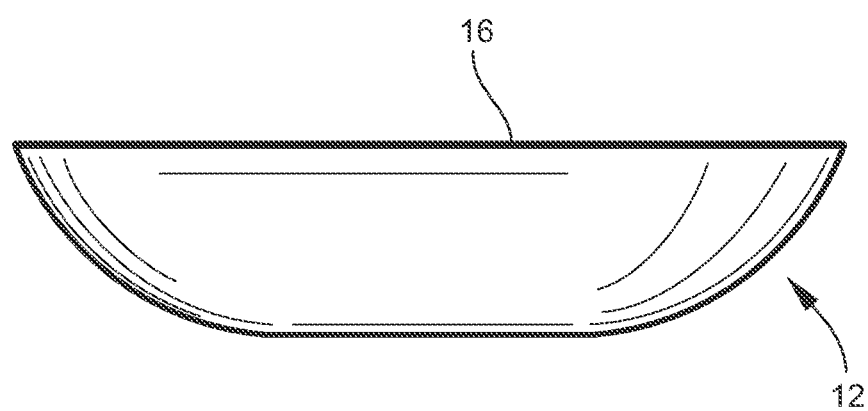
FIG. 4 is a side view of the scoop of the retainer apparatus.

Referring now specifically to the drawings, a retainer apparatus is illustrated in FIGS. 1, 2, 7, 8, and 9 and is shown generally at reference numeral 10. The retainer apparatus 10 consists of a scoop 12 and a retention device 14. The scoop 12 is generally circular having a top side and a bottom side. The top side is concave and shaped generally like a bowl, as shown in FIG. 3. The bottom side is a reverse of the top side and generally convex shaped. On the top side, the scoop 12 contains a base that extends outwardly and upwardly to an outer edge 16, as shown in FIGS. 2, 3, and 4.

An opening 18 is formed within the scoop 12 and preferably within the center of the scoop 12. The opening 18 has a top side to a bottom side on either side of the opening 18. As illustrated, the opening 18 is elongated and extends from a first end to a second end. The first end and the second end of the opening 18 have the same width. The central portion of the opening 18 contains an arcuate portion that gradually increases the width of the opening 18 from the first end to a centralized point and gradually decreases the width of the opening 18 to the second end. The arcuate portion is located on the top side and the bottom side of the opening 18, near the central portion of the opening 18. The scoop 12 may be composed of metal, plastic, wood, or the like.

Figure 5:
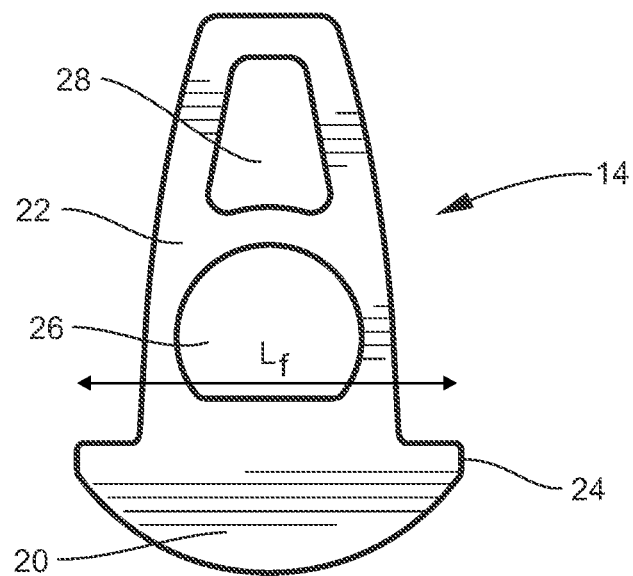
FIG. 5 is a front view of the retention device.
Figure 6:
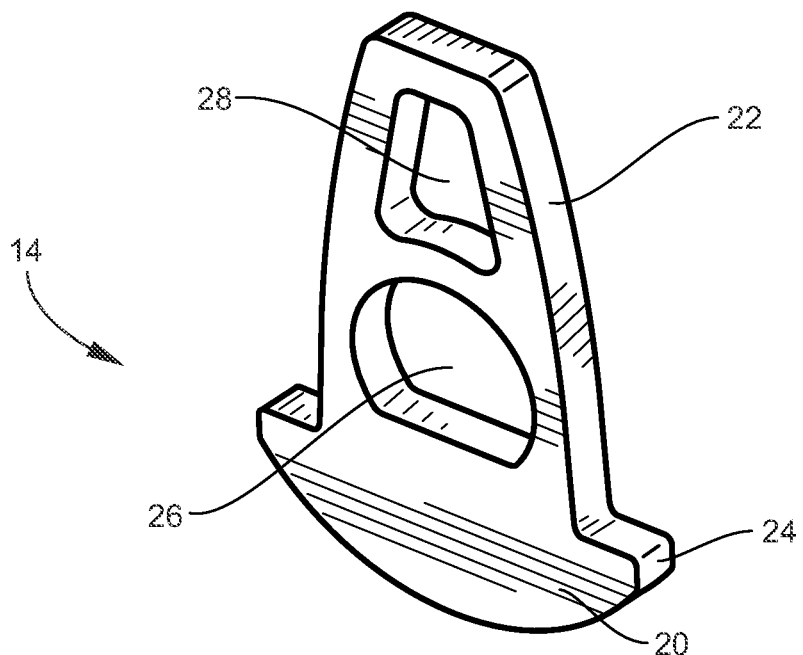
FIG. 6 is a perspective view of the retention device.

The retention device 14, as illustrated in FIGS. 5 and 6, contains a base 20 with an upwardly extending flange 22. The bottom side of the base 20 is generally curved and extends to two opposed side portions 24, extending from the bottom side of the base 20 to the top side of the base 20. The top side of the base 20 is generally flat. The flange 22 extends upwardly from the top side of the retention device 14. The first side of the flange 22 is engaged to the top side of the base 20. The flange 22 gradually decreases in width until it reaches the second end of the flange 22. The flange 22 includes a first opening 26 and a second opening 28. The first opening 26 is adjacent the first side of the flange 22 and is generally circularly shaped. The second opening 28 is adjacent the second side of the flange 22 and is generally triangularly shaped. It should be noted the first opening 26 and second opening 28 may be any shape as desired by the user. The retention device 14 may be composed of metal, plastic, wood, or the like. In an alternative embodiment, the retention device 14 is composed of a material that is different than the material the scoop 12 is composed. For example, the scoop 12 may be composed of metal and the retention device 14 may be composed of plastic. Alternatively, the scoop 12 may be composed of plastic and the retention device 14 may be composed of metal.

The first opening 26 has a generally flat bottom portion that is in close proximity to the first side of the flange 22 and has a first end and a second end. A side portion extends circularly from the first end to the second end of the bottom portion of the first opening 26. Except for the flat bottom portion, the first opening is generally circular.

The second opening 28 contains a generally concave base portion with a first end and a second end. A first side portion extends upwardly from the first end of the base portion and a second side portion extends upwardly from the second end of the base portion. The first side portion and the second side portion are angled towards each other and the distance between the first side portion and the second side portion decreases as the first side portion and the second side portion extend from the base portion. The first end of the first side portion and the second side portion are engaged to the first end and the second end, respectively, of the base portion. The second end of the first side portion is engaged to a first end of a top portion. The second end of the second side portion is engaged to the second end of the top portion. The length of the top portion is less than the length of the base portion.

Figure 7:
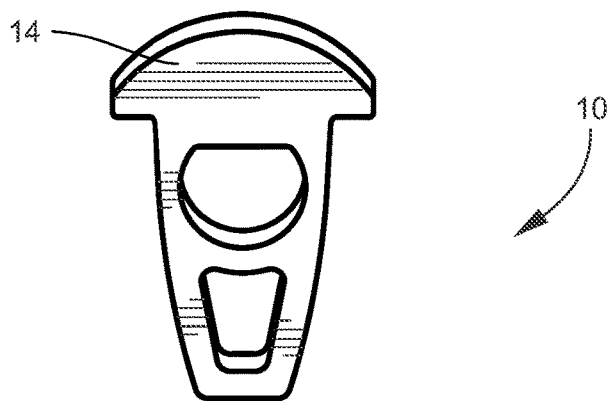
FIG. 7 is a perspective view of the retention device being inserted into the opening of the scoop of the retainer apparatus.

The retention device 14 is inserted into the opening 18 of the scoop 12. As shown in FIG. 7. Specifically, the first side of the flange 22 of the retention device 14 is inserted into the bottom side of the scoop 12 and extends through the top side of the scoop 12. The retention device 14 is pushed through the opening 18 until the flat portion of the base 20 of the retention device 14 engages the bottom side of the scoop 12. The base 20 of the retention device 14 is wider than the width of the opening 18, thus preventing the base 20 from extending through the opening 18. As shown in FIGS. 3 and 5, the flange 22, which has a length ($L_f$) less than the length of the opening ($L_o$), extends through the opening 18, but the base 20 does not.

Figure 8:
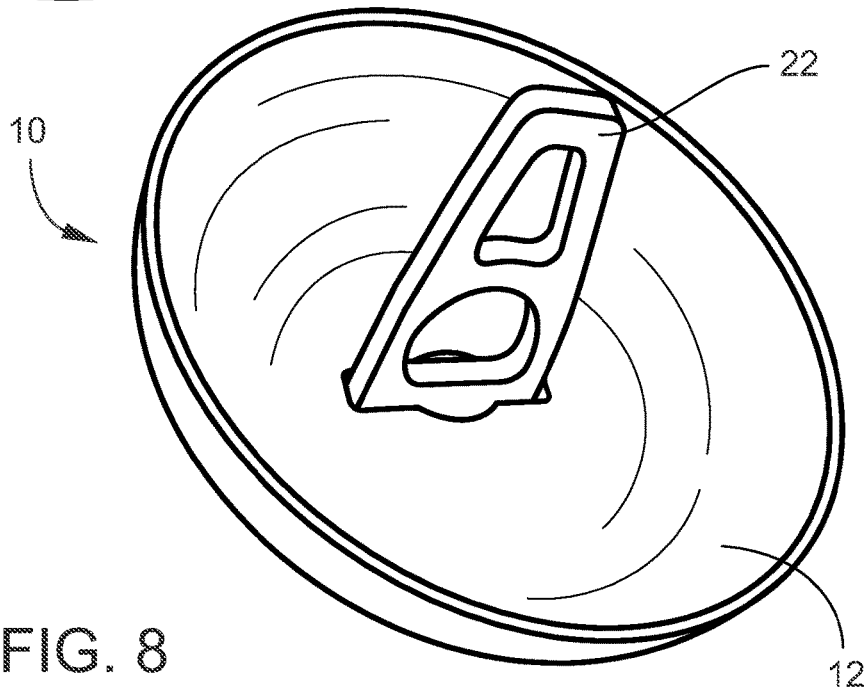
FIG. 8 is a front perspective view of the retainer apparatus.
Figure 9:
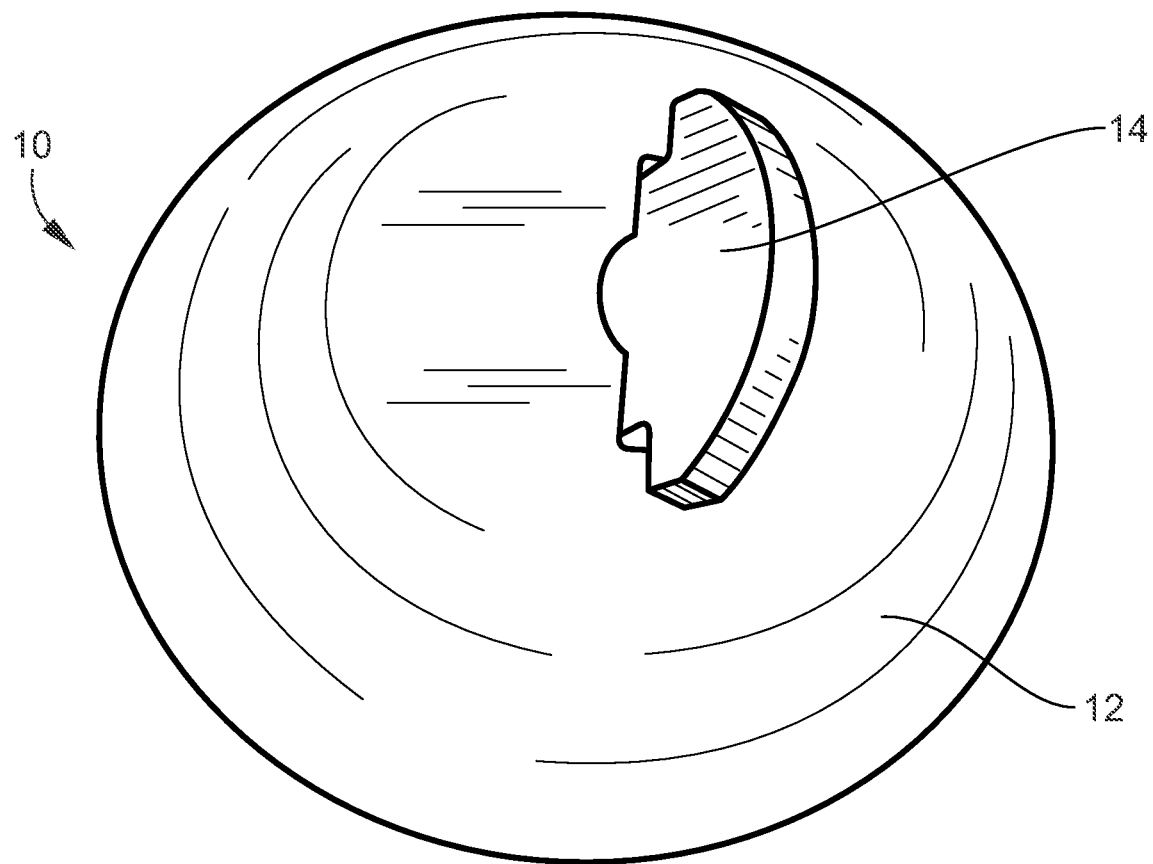
FIG. 9 is a back perspective view of the retainer apparatus.
Figure 10:
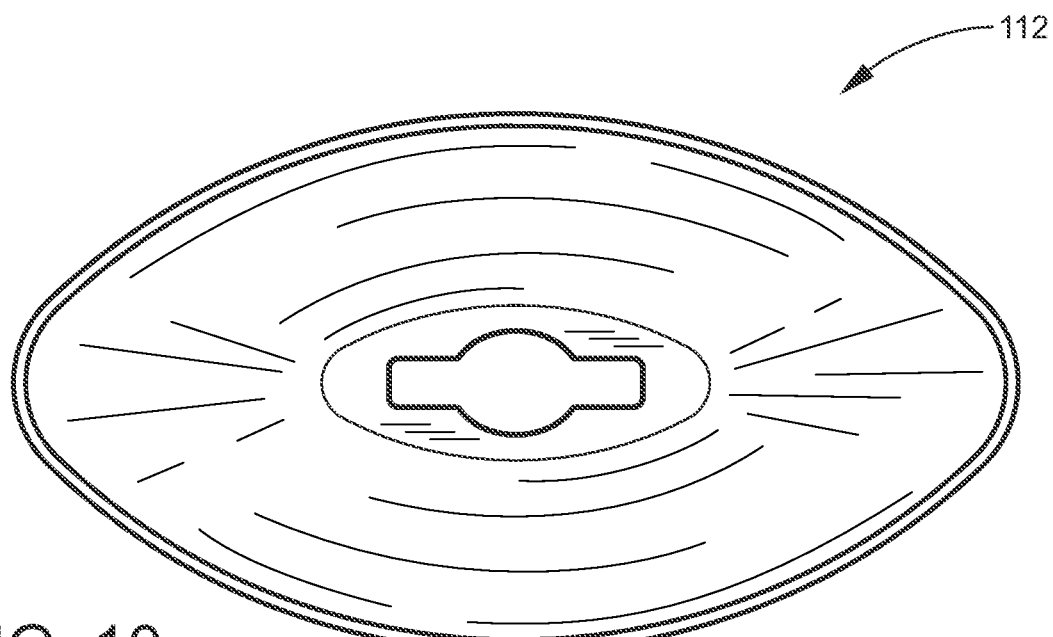
FIG. 10 is a top view of an alternative embodiment of the scoop of the retainer apparatus.
Figure 11:
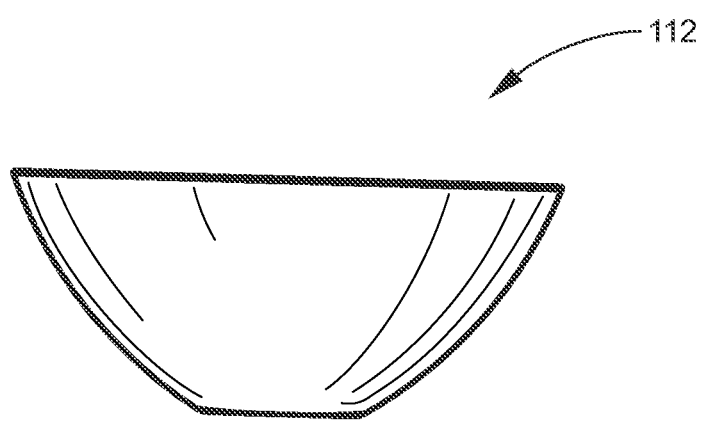
FIG. 11 is a side view of an alternative embodiment of the scoop of the retainer apparatus.
Figure 12:
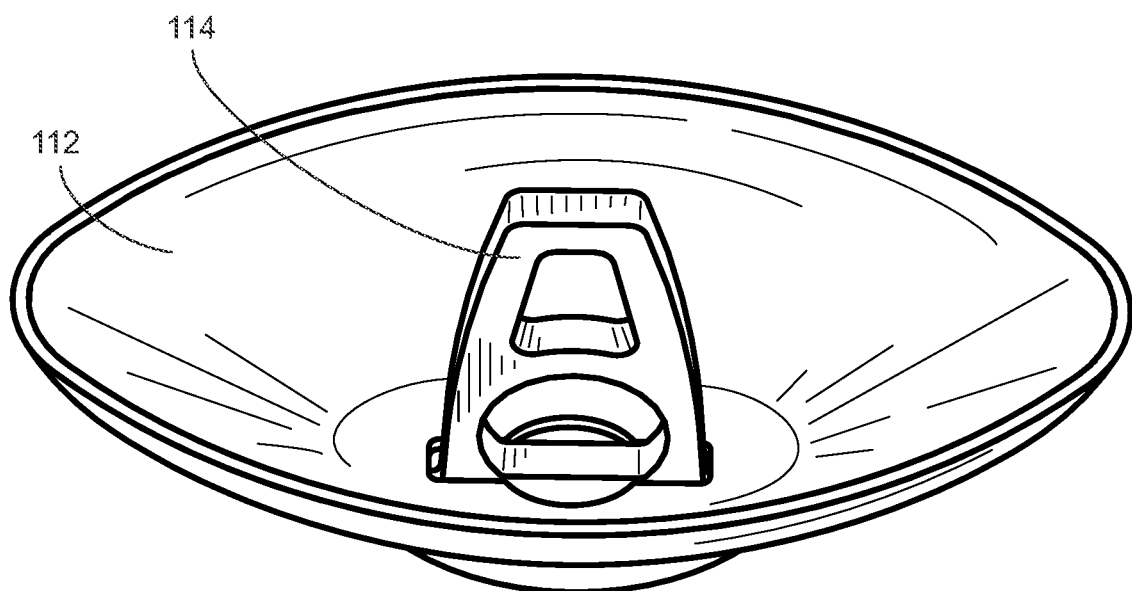
FIG. 12 is a perspective view of the retention device inserted into the alternative embodiment of the scoop of the retainer apparatus.
Figure 13:
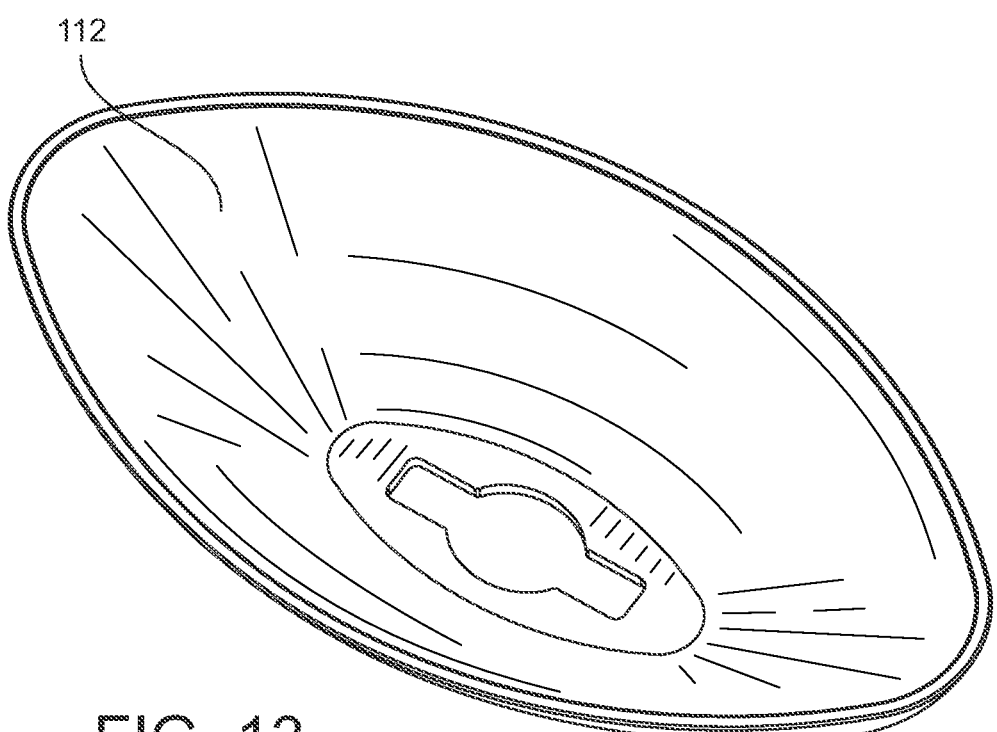
FIG. 13 is a perspective view of an alternative embodiment of the scoop of the retainer apparatus.

During use, a user uses the scoop 12 to dig a hole in sand or dirt, as shown in FIGS. 17A-17D, 19A, 20A, 21A, and 22A. The scoop 12 allows the user to penetrate the sand or dirt, and also to scoop the sand or dirt away forming a hole. Once the hole is dug, the user inserts the retention device 14 through the opening 18 in the scoop 12, as shown in FIGS. 17E, 19B, 20B, 21B, and 22B. The flange 22 is inserted first through the opening and pushed through the opening 18 until the base 20 contacts the scoop as illustrated in FIGS. 7,8, and 9. The base 20 of the retention device 14 engages the bottom side of the scoop 12, preventing the retention device 14 from traveling entirely through the opening 18, as shown in FIG. 9. The apparatus 10 is engaged to a rope 30 or leash 32 and inserted into the hole previously dug by the scoop 12, as shown in FIGS. 17E, 19B, 20B, 20B, and 22B and the dirt or sand is then replaced within the hole and on top of the apparatus 10, as shown in FIGS. 17F, 19C, 20C, 21C, and 22C. In addition to dirt and sand, the apparatus 10 may be used in snow, rocks, and the like.

Figure 21C:
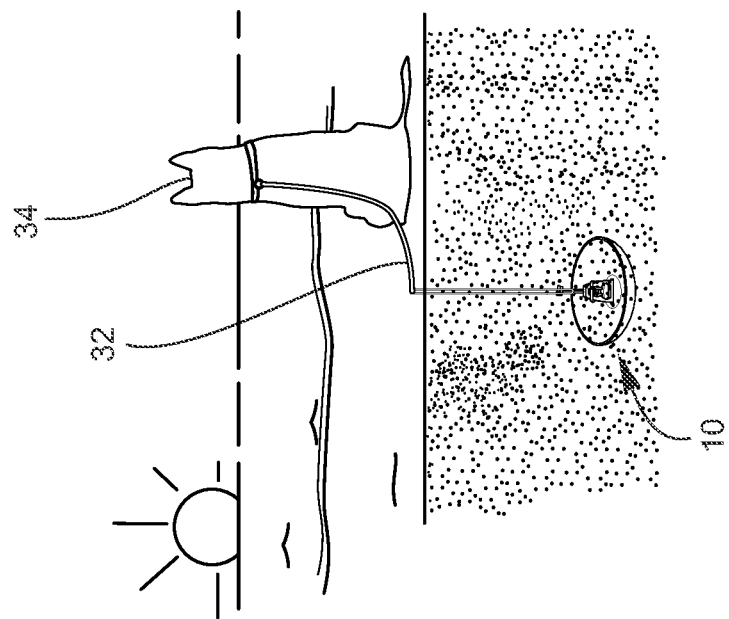
FIG. 21C is a side view of the retainer apparatus retaining a dog.
Figure 21B:
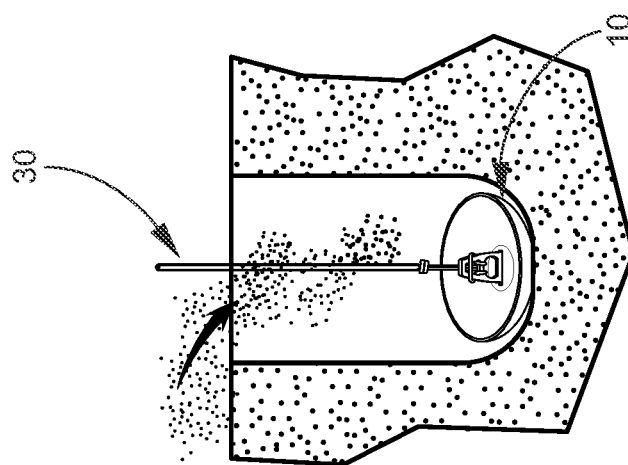
FIG. 21B is a side view of the retainer apparatus engaged to a leash.
Figure 21A:
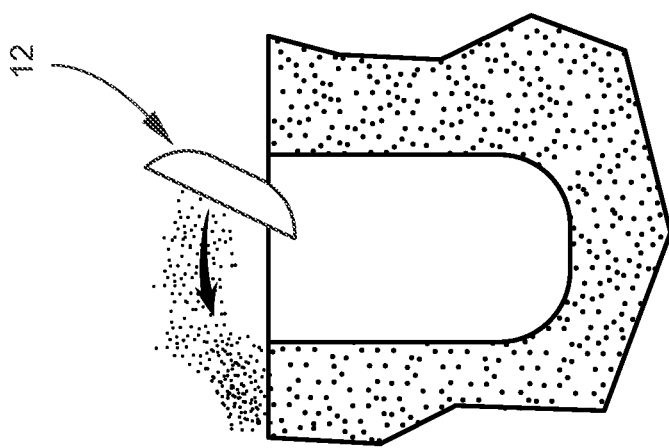
FIG. 21A is a side view of the scoop being used to dig a hole.
Figure 22C:
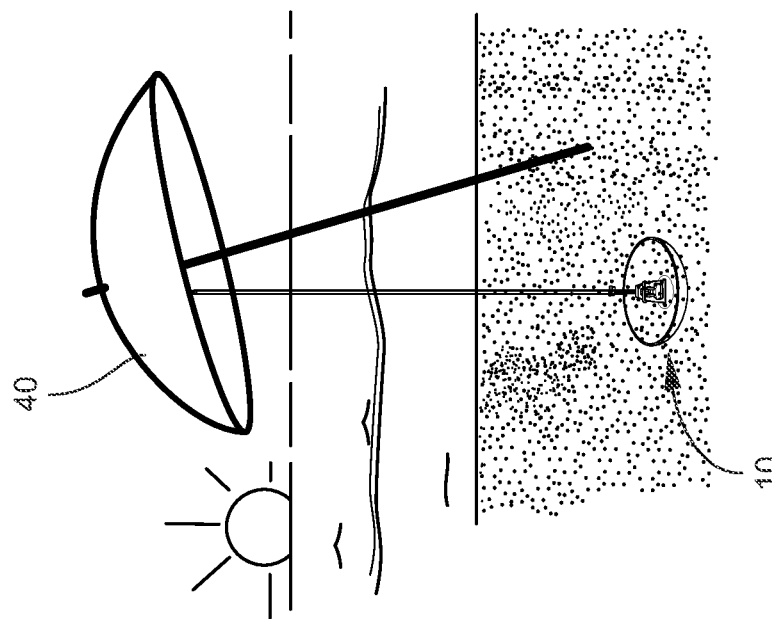
FIG. 22C is a side view of the retainer apparatus retaining an umbrella.
Figure 22B:
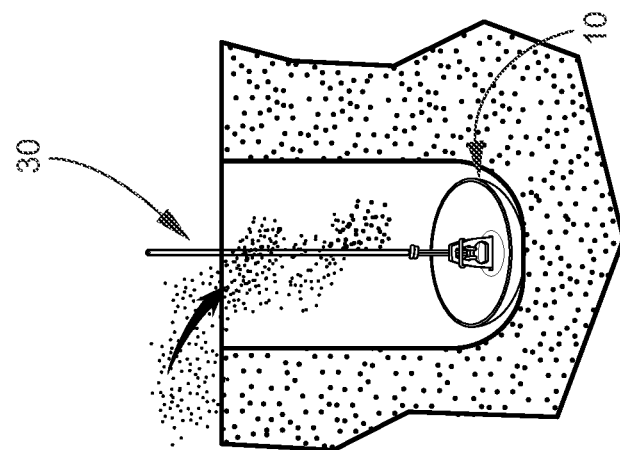
FIG. 22B is a side view of the retainer apparatus engaged to a rope.
Figure 22A:
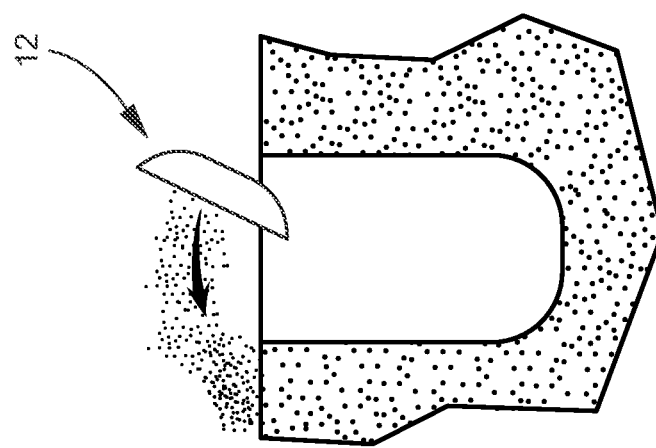
FIG. 22A is a side view of the scoop being used to dig a hole.

As shown in FIG. 21C, a dog leash 32 is engaged to one of the openings (26, 28). The apparatus 10 is then placed within the hole and sand is placed within the hole, burying the apparatus 10 and retaining the apparatus 10 within the hole, as shown in FIGS. 21A and 21B. One end of the dog leash 32 is buried with the apparatus 10, but the opposite side of the leash is retained outside the hole and engaged to a leash of the dog 34, retaining the dog 34 within a confined area near the hole with the apparatus 10 therein. In another embodiment as illustrated in FIGS. 18, 19A-19C, 20A-20C, 22A-22C, an end of a rope 30 is engaged to one of the openings (26, 28) and the other end is engaged to canopy 36, cooler 38, or umbrella 40.

Figure 14:
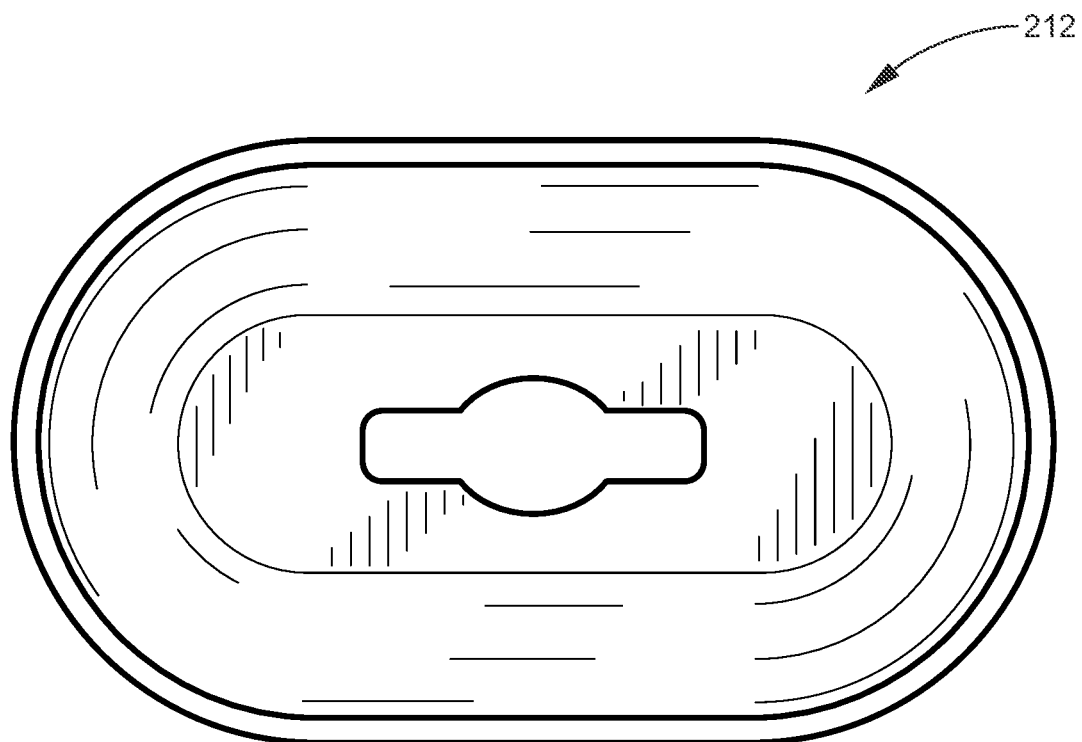
FIG. 14 is a top view of an alternative embodiment of the scoop of the retainer apparatus.
Figure 15:
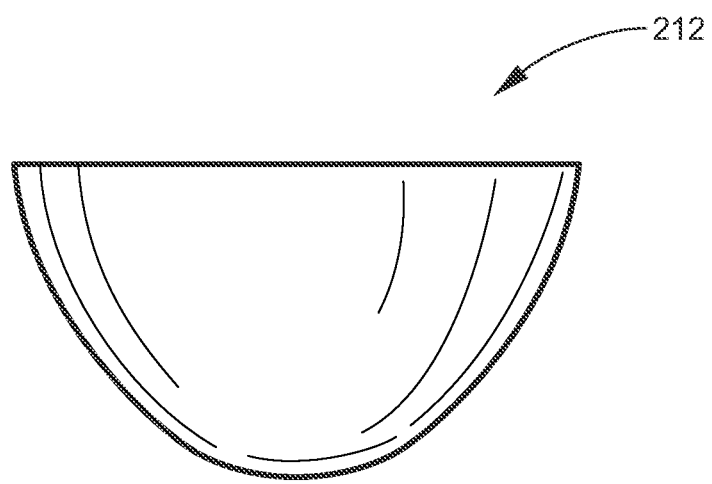
FIG. 15 is a side view of an alternative embodiment of the scoop of the retainer apparatus.
Figure 16:
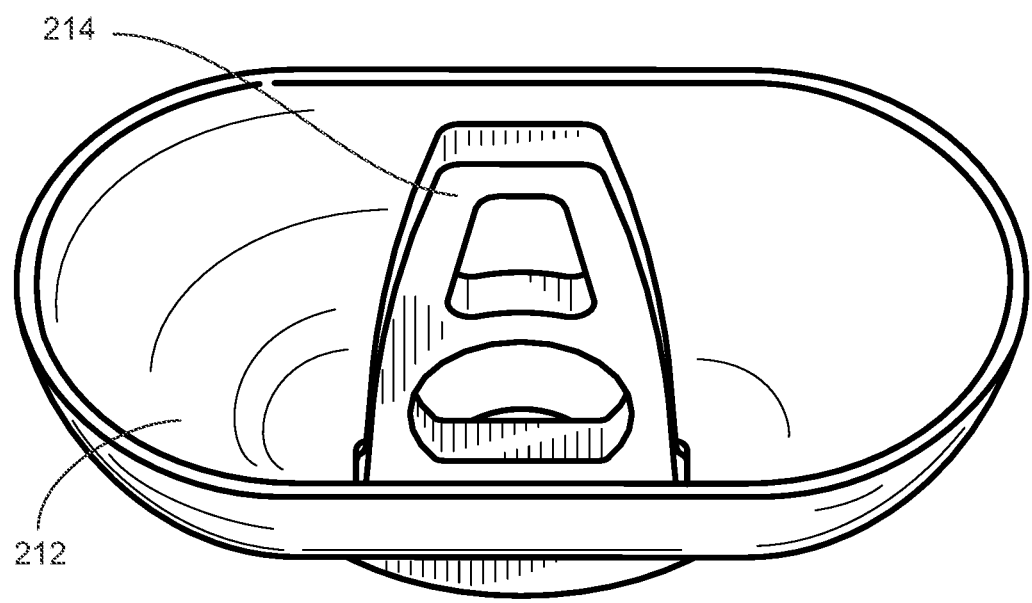
FIG. 16 is a perspective view of a retention device inserted into the alternative embodiment of the scoop of the retainer apparatus.
Figure 17A:
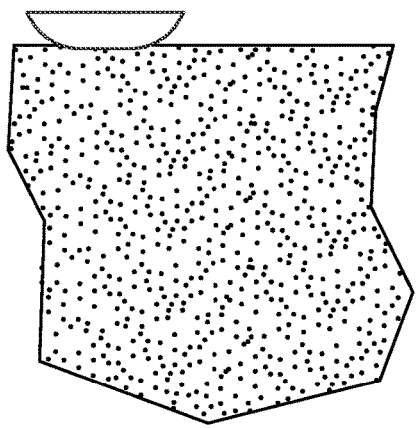
FIG. 17A is a side view illustrating the scoop placed on top of sand.
Figure 17B:
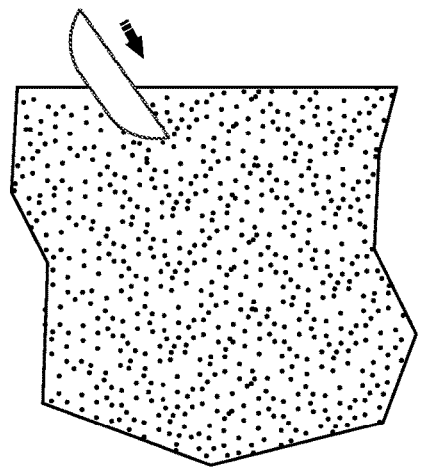
FIG. 17B is a side view illustrating the scoop digging into the sand.
Figure 17C:
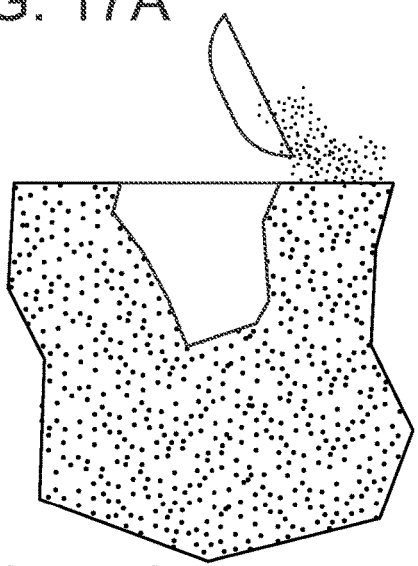
FIG. 17C is a side view of the scoop scooping sand to form a hole.
Figure 17D:
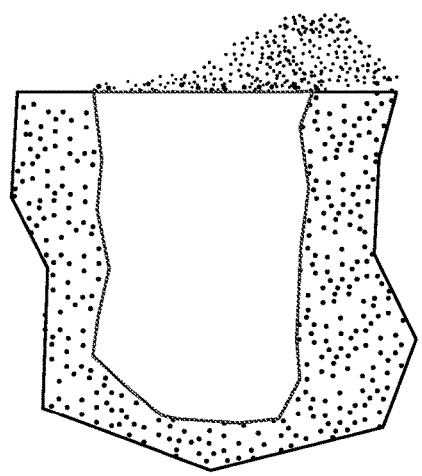
FIG. 17D is a side view of a hole formed by the scoop.
Figure 17E:
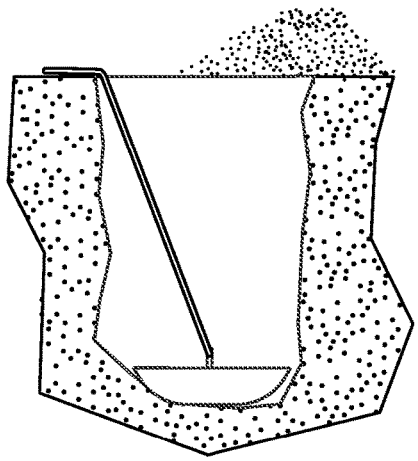
FIG. 17E is a side view of the scoop with rope placed within the hole.
Figure 17F:
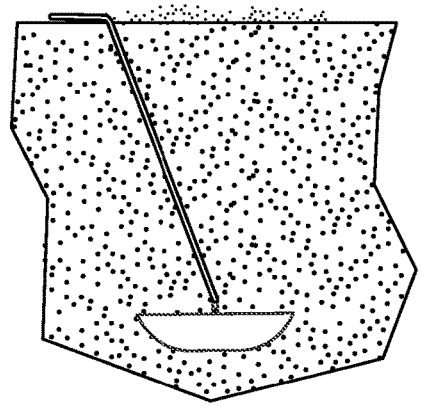
FIG. 17F is a side view of the scoop with rope placed within the hole and sand placed on the scoop and rope.
Figure 18:
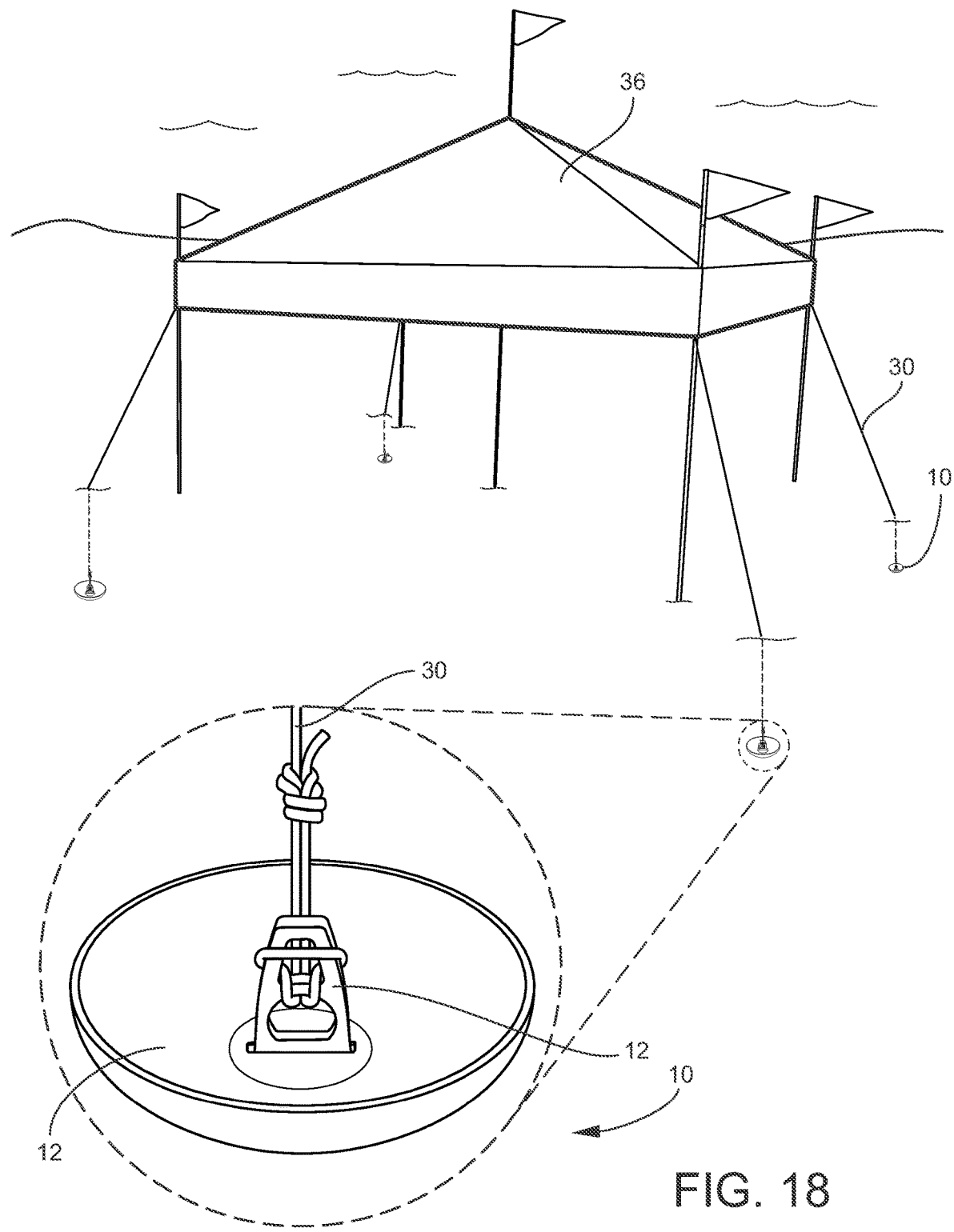
FIG. 18 is a detailed view of the retainer apparatus placed within the sand and retaining one end of a canopy on the ground.
Figure 19C:
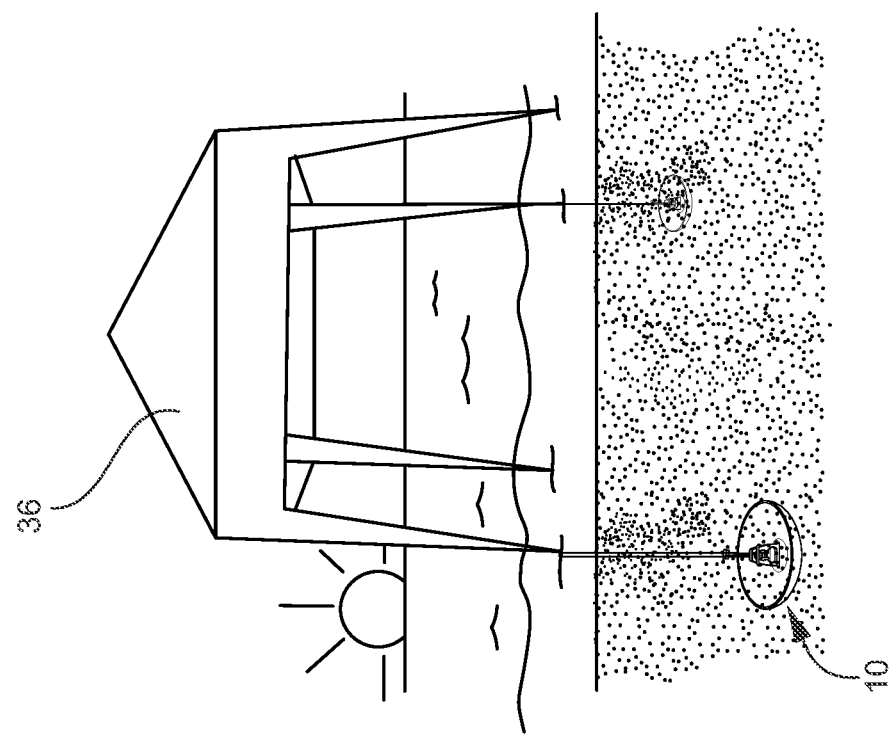
FIG. 19C is a side view of multiple retainer apparatuses retaining a canopy.
Figure 19B:
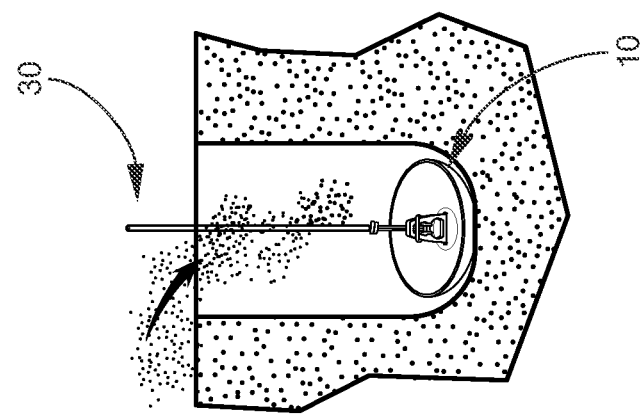
FIG. 19B is a side view of the retainer apparatus within a hole and engaged to a rope.
Figure 19A:
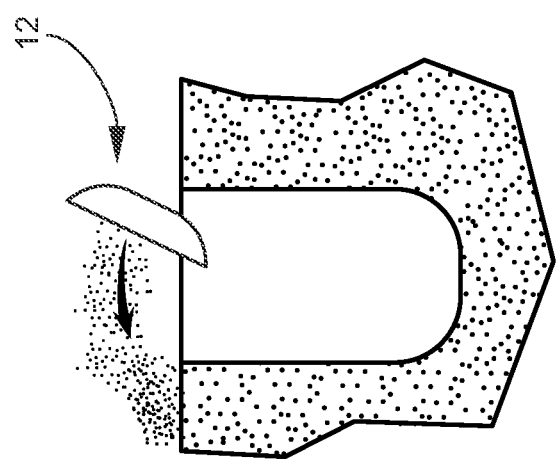
FIG. 19A is a side view of the scoop being used to dig a hole.
Figure 20C:
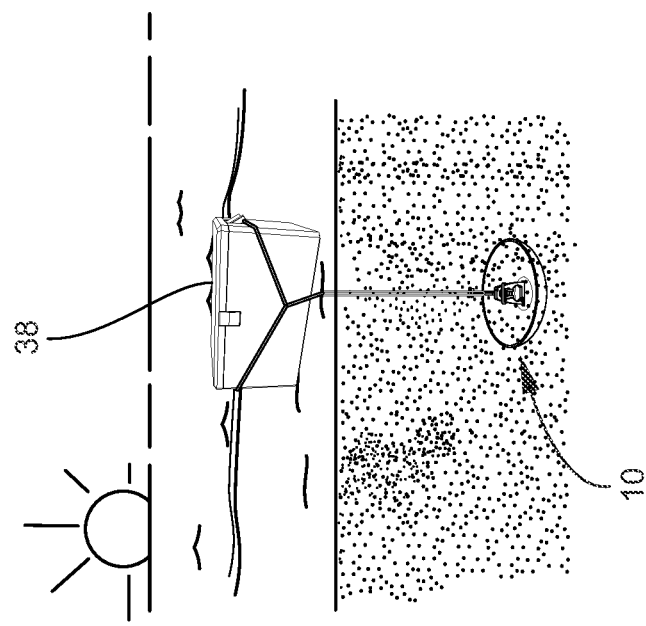
FIG. 20C is a side view of a retainer apparatus retaining a cooler.
Figure 20B:
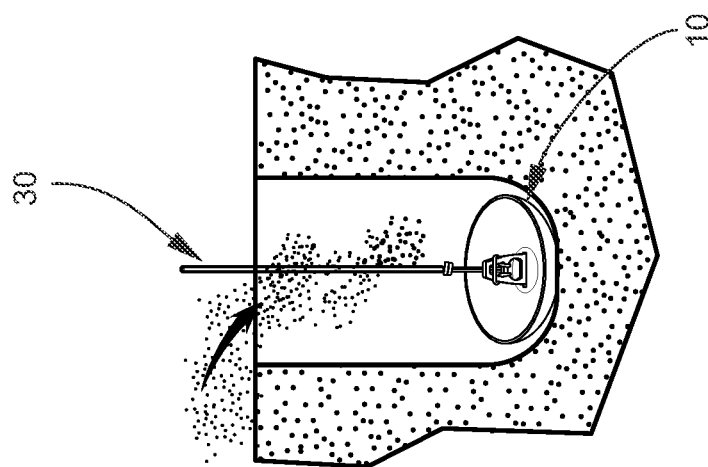
FIG. 20B is a side view of the retainer apparatus within a hole and engaged to a rope.
Figure 20A:
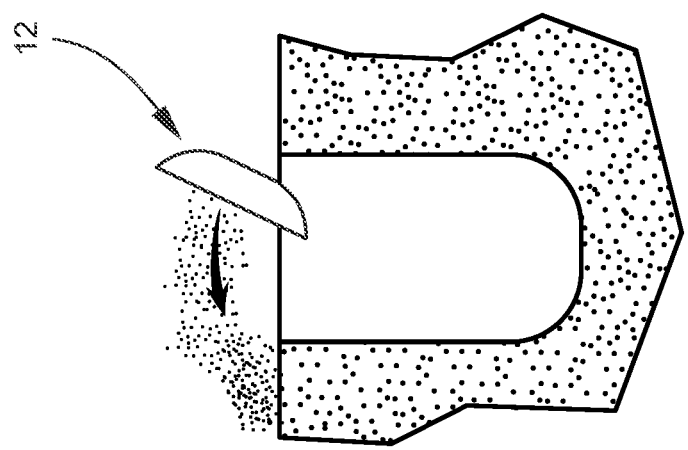
FIG. 20A is a side view of the scoop being used to dig a hole.

As illustrated in FIGS. 10, 11, 12, and 13, the scoop 112 may be shaped like a football having a top side and a bottom side that interconnects at each end forming rounded ends at each end of the scoop 112. The shape is generally oblong. As illustrated in FIGS. 14 and 15, the scoop 212 is generally oval shaped.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A retainer apparatus, comprising:
   a scoop having an exterior surface and an interior surface with a central opening, the central opening is elongated and extends from the exterior surface to the interior surface of the scoop, the central opening has a first end, a second end, and a central portion disposed between the first end and the second end, the first end extends outwardly from the central portion and contains a first portion and a second portion, wherein the first portion and second portion are spaced apart, the second end extends outwardly from the central portion and contains a first portion and a second portion, wherein the first portion and second portion are spaced apart, the second portion of the first end is disposed on one side of the central portion and the second portion of the second end is disposed on an opposite side of the central portion, the central portion contains a first arcuate portion disposed on a top side of the central portion that gradually increases the width of the central portion from the second portion of the first end to a centralized point and gradually decreases the width of the central portion to the second portion of the second end and a second arcuate portion opposite the first arcuate portion on the bottom side of the central portion that gradually increases the width of the central portion from the second portion of the first end to a centralized point and gradually decreases the width of the opening to the second portion of the second end; and
   a retention device having a base portion with a length greater than the length of the central opening of the scoop and a flange portion extends upwardly from the base portion and contains at least one opening, the base portion has a bottom side and a top side, the top side of the base portion contains two-opposed side portions, wherein each side portion forms a shelf, the flange portion has a first side and a second side, the first side of the flange portion extends upwards from the top side of the base portion between the side portions, the flange portion gradually decreases in width over the entire length of the flange portion,
   wherein the retention device is separate from the scoop and the flange portion is inserted into the central opening of the scoop.

2. The retainer apparatus according to claim 1, wherein the scoop is generally circularly shaped.

3. The retainer apparatus according to claim 1, wherein the scoop is concave.

4. The retainer apparatus according to claim 1, wherein the scoop and retention device is composed of metal.

5. The retainer apparatus according to claim 1, wherein the scoop is generally oval shaped.

6. The retainer apparatus according to claim 1, wherein the scoop is composed of a different material than the retention device.

7. The retainer apparatus, comprising:
   a generally concave scoop having an exterior surface and an interior surface, the scoop has a flat base that extends outwardly and a concentric side portion extends outwardly and upwardly from the flat base to an outer edge with a central opening disposed within the flat base extending from the interior surface to the exterior surface, the central opening is elongated and extends from the exterior surface to the interior surface of the scoop, the central opening has a first end, a second end, and a central portion disposed between the first end and the second end, the first end extends outwardly from the central portion and contains a first portion and a second portion, wherein the first portion and second portion are spaced apart, the second end extends outwardly from the central portion and contains a first portion and a second portion, wherein the first portion and second portion are spaced apart, the second portion of the first end is disposed on one side of the central portion and the second portion of the second end is disposed on an opposite side of the central portion, the central portion contains a first arcuate portion disposed on a top side of the central portion that gradually increases the width of the central portion from the second portion of the first end to a centralized point and gradually decreases the width of the central portion to the second portion of the second end and a second arcuate portion opposite the first arcuate portion on the bottom side of the central portion that gradually increases the width of the central portion from the second portion of the first end to a centralized point and gradually decreases the width of the opening to the second portion of the second end; and a retention device having a base portion with a length greater than the length of the central opening of the scoop and a flange portion that extends upwardly from the base portion and contains at least one opening and gradually decreases in width over the entire length of the flange portion.

8. The retainer apparatus according to claim 7, wherein the scoop is generally circularly shaped.

9. The retainer apparatus according to claim 7, wherein the scoop and retention device are composed of plastic.

10. The retainer apparatus according to claim 7, wherein the flange portion comprises two openings.

11. The retainer apparatus according to claim 7, wherein the opening of the flange portion has a flat bottom portion with a first end and a second end, a side portion extends circularly from the first end to the second end of the bottom portion of the opening.

12. The retainer apparatus according to claim 7, wherein the scoop is composed of a different material than the retention device.

13. A retainer apparatus, comprising:
a generally concave scoop having an exterior surface and an interior surface;
an elongated slot between a first end and a second end running through a central portion of the exterior surface and the interior surface of a bottom of the scoop, the first end and the second end of the slot having width, a generally circular opening in a center of the slot having a larger diameter than the width of the first end and the second end of the elongated slot; and
a retention device having a base having an upper portion with a length greater than the length of the elongated slot, of the scoop and a flange portion with a first side and a second side that extends upwardly from the upper portion of the base and contains two openings, the flange portion gradually decreases in width over the entire length of the flange portion and wherein the retention device is separate from the scoop and the flange portion is inserted into the elongated slot of the scoop until the upper portion of the base rests against a bottom surface of the scoop.

14. The retainer apparatus according to claim 13, wherein the scoop and retention device are composed of metal, plastic, and/or wood.

15. The retainer apparatus according to claim 13, wherein the two openings of the flange portion comprises a first opening and a second opening, the first opening is disposed adjacent the first side of the flange portion and the second opening is disposed adjacent the second side of the flange portion.

16. The retainer apparatus according to claim 13, wherein the scoop is generally oval shaped.

17. The retainer apparatus according to claim 13, wherein the scoop is composed of a different material than the retention device.

18. The retainer apparatus according to claim 13, further comprising a rope engaged to the flange portion.

19. A retainer system comprising in combination:
a bowl having a generally concave inner walls and generally convex outer walls with a bottom having a generally flat inner surface and generally flat outer surface;
an elongated slot between a first end and a second end running through a central portion of the inner surface and the outer surface of the bottom of the bowl, the first end and the second end of the slot having width, a generally circular opening in a center of the slot having a larger diameter than the width of the first end and the second end of the elongated slot;
a retention device having a base portion with a length greater than a length between the first end and the second end of the slot, the base having opposed side portions extending sideways with a generally flat upper surface, a flange extending upward from the base having a width that decreases in width from a lower end to a top end, two stacked openings in the flange between the base and the top end of the flange, wherein the top end of the flange is inserted into the elongated slot so that the flat upper surface of the base abuts against portions of the bottom adjacent to the generally flat outer surface of the bowl; and
at least one of a leash or a rope has one end attached to at least one of the two stacked openings in the flange and a second end attached to an object, wherein the object is held in place by burying the bowl with the retention device in a hole with the second end of the at least one of a leash outside of the hole.

20. The retention system of claim 19, wherein the two stacked openings include:
a top opening having a generally upper triangular configuration; and
a lower opening having a generally upper circular configuration.

* * * * *